Jan. 7, 1930.   L. WETMORE   1,743,070
MACHINE FOR CUTTING SHEET MATERIAL
Filed March 9, 1926   5 Sheets-Sheet 1

Inventor
Laurence Wetmore,
By
Attorney

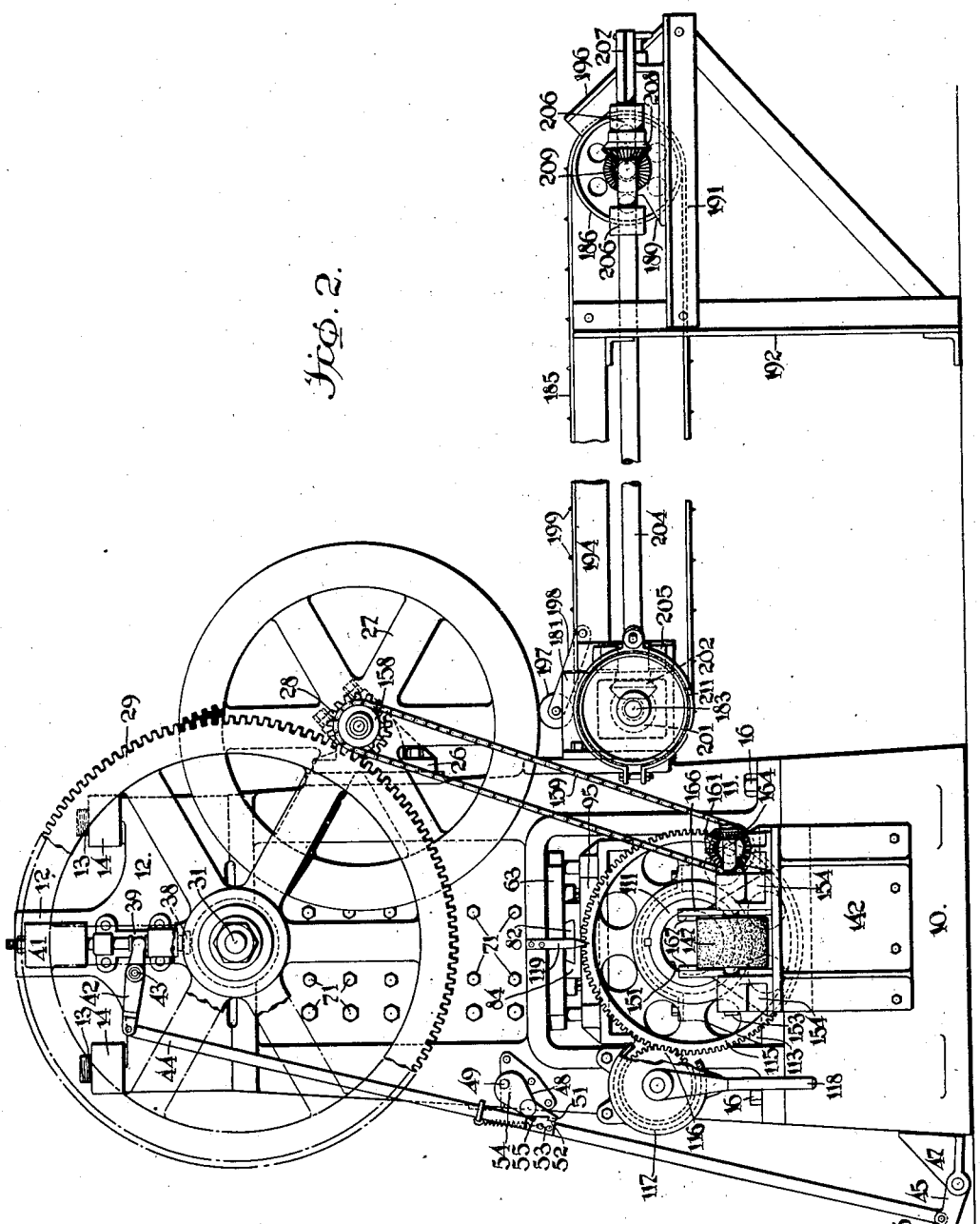

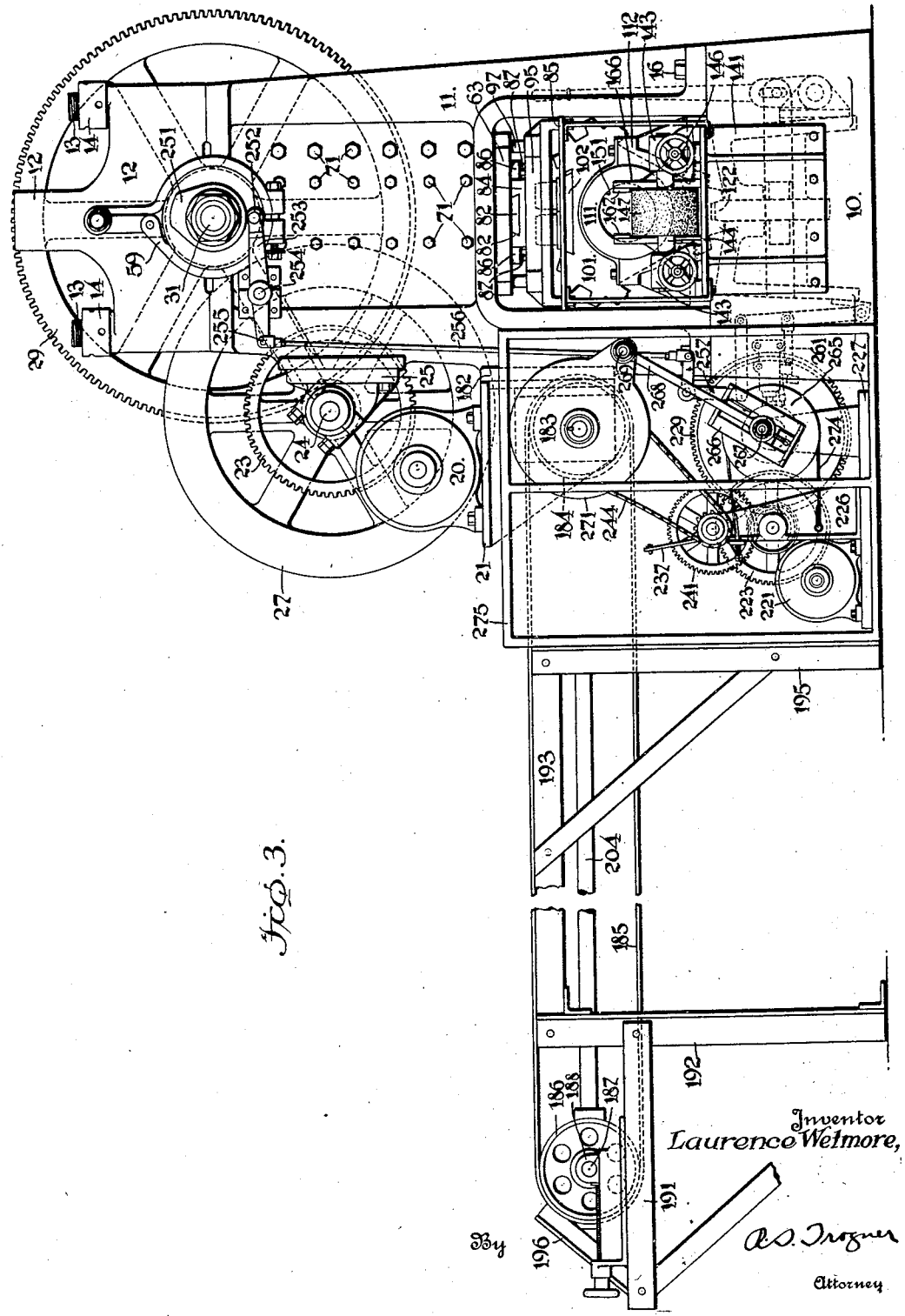

Jan. 7, 1930.  L. WETMORE  1,743,070
MACHINE FOR CUTTING SHEET MATERIAL
Filed March 9, 1926  5 Sheets-Sheet 4
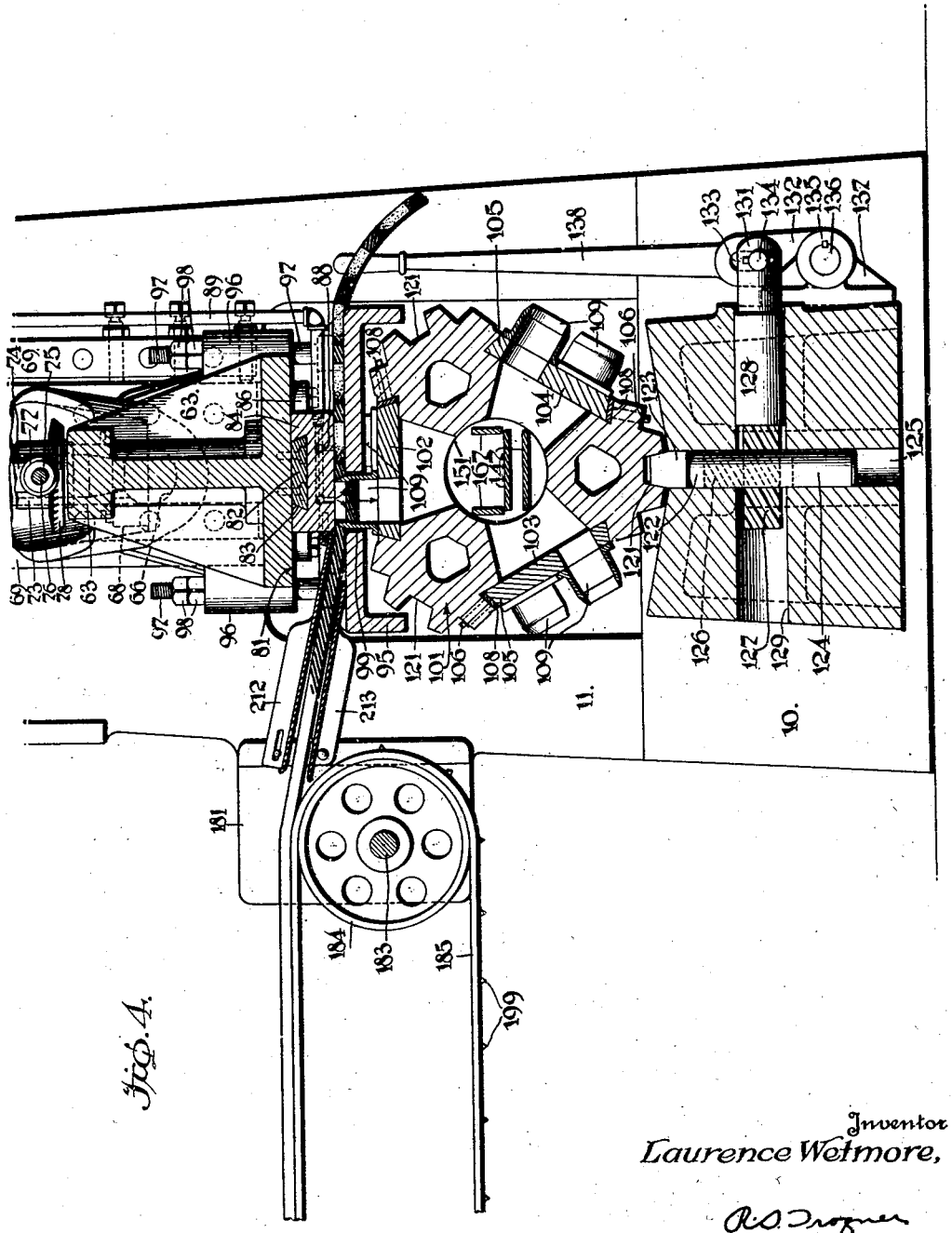
Inventor
Laurence Wetmore,
By
Attorney

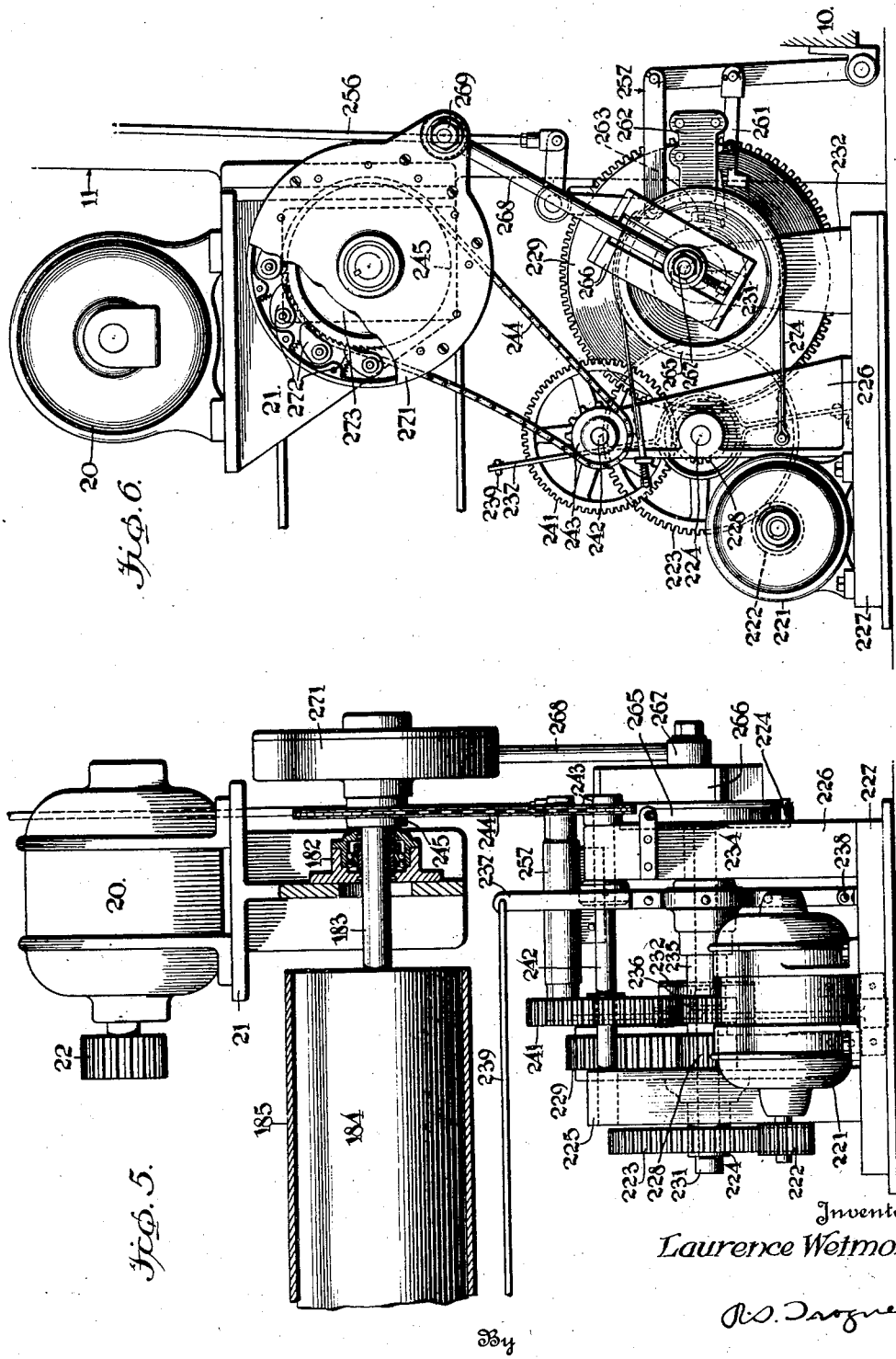

Patented Jan. 7, 1930

1,743,070

UNITED STATES PATENT OFFICE

LAURENCE WETMORE, OF AKRON, OHIO, ASSIGNOR TO THE GOODYEAR TIRE & RUBBER COMPANY, OF AKRON, OHIO, A CORPORATION OF OHIO

MACHINE FOR CUTTING SHEET MATERIAL

Application filed March 9, 1926. Serial No. 93,431.

My invention relates to the art of manufacturing molded rubber articles, and it has particular reference to a machine for cutting slugs or blanks from resilient material that may be vulcanized to form rubber heels.

Heretofore slugs of unvulcanized rubber, having the general shape and size of rubber heels, have been stamped or died out from a sheet of resilient material, by means of a suitable die held manually against the sheet, and forced therethrough by reciprocating mechanism positioned above the sheet and the die. Since a machine operator is able to control but one die, the output of machines intended for this work has been limited to one slub per stroke of the reciprocating member. A sheet from which the slugs are cut is usually prepared by securing a number of layers of rubber to each other by passing them between calender rolls, and hence, a certain variation in the thickness of the sheet is unavoidable, due to the methods of manufacture employed. To overcome this difficulty, the operators of the older type of machines have been furnished with dies of different area, which they employed or discarded, according to the variations in the sheet, in order to obtain heel slugs of substantially uniform volume.

The manufacturing cost per heel attributable to the operation of forming the slug has been relatively high, due to the low output from each machine, and due also to excessive waste resulting from the inability of the operator to locate properly the die upon the surface of the sheet. At times the operator will so position the die that it overlaps an edge of the sheet, in an attempt to reduce the amount of waste material, with a result that the severed slug must be discarded. At other times, the margin allowed is excessive.

It is customary, in cutting slugs or blanks from sheet material of unvulcanized rubber, to coat the surface with a suitable protective material, such as powdered talc or soapstone. This coating is intended to prevent severed slugs from sticking to each other, or from adhering to the mold in which they are vulcanized. It is impracticable, however, to coat the entire slug, and a certain amount of sticking between the edges of the slugs has resulted when they were prespared by the old hand method. At times, also, the coating of soapstone has been too thick, with the result that the vulcanized heel was discolored or blemished upon its surface. It is apparent, therefore, that the success of manufacture depends to a large extent upon rapidity of operation, upon a high quantity output within a given period of time, and upon proper treatment of the material prior to vulcanization.

It is the primary object of the invention to provide a machine for cutting slugs of substantially uniform volume from slabs or sheets of material. The invention also comprehends a machine to cut slugs rapidly and with a minimum amount of waste material.

The specific embodiment of a machine described herein to illustrate the principles of the invention includes a reciprocatory member that forces a plurality of dies through a sheet of stock to form a number of slugs at each stroke of the machine, mechanism to vary the sizes of the dies in accordance with variations in the thickness of the sheet, means to remove the slugs cut therefrom, and mechanism to feed periodically the sheet to the dies. Various other objects and aspects of the invention will become apparent from a perusal of the following detailed description thereof, wherein reference is made to the accompanying drawings, in which:

Fig. 2 is a side elevational view as observed from the right of Fig. 1;

Fig. 3 is an elevational view taken on the opposite side of the machine;

Fig. 4 is a fragmentary cross-sectional view looking toward the slug discharge side;

Fig. 5 is an elevational view of some of the stock feeding mechanism, looking toward the intake end of the machine; and Fig. 6 is a side elevational view of the same elements.

Figure 1:
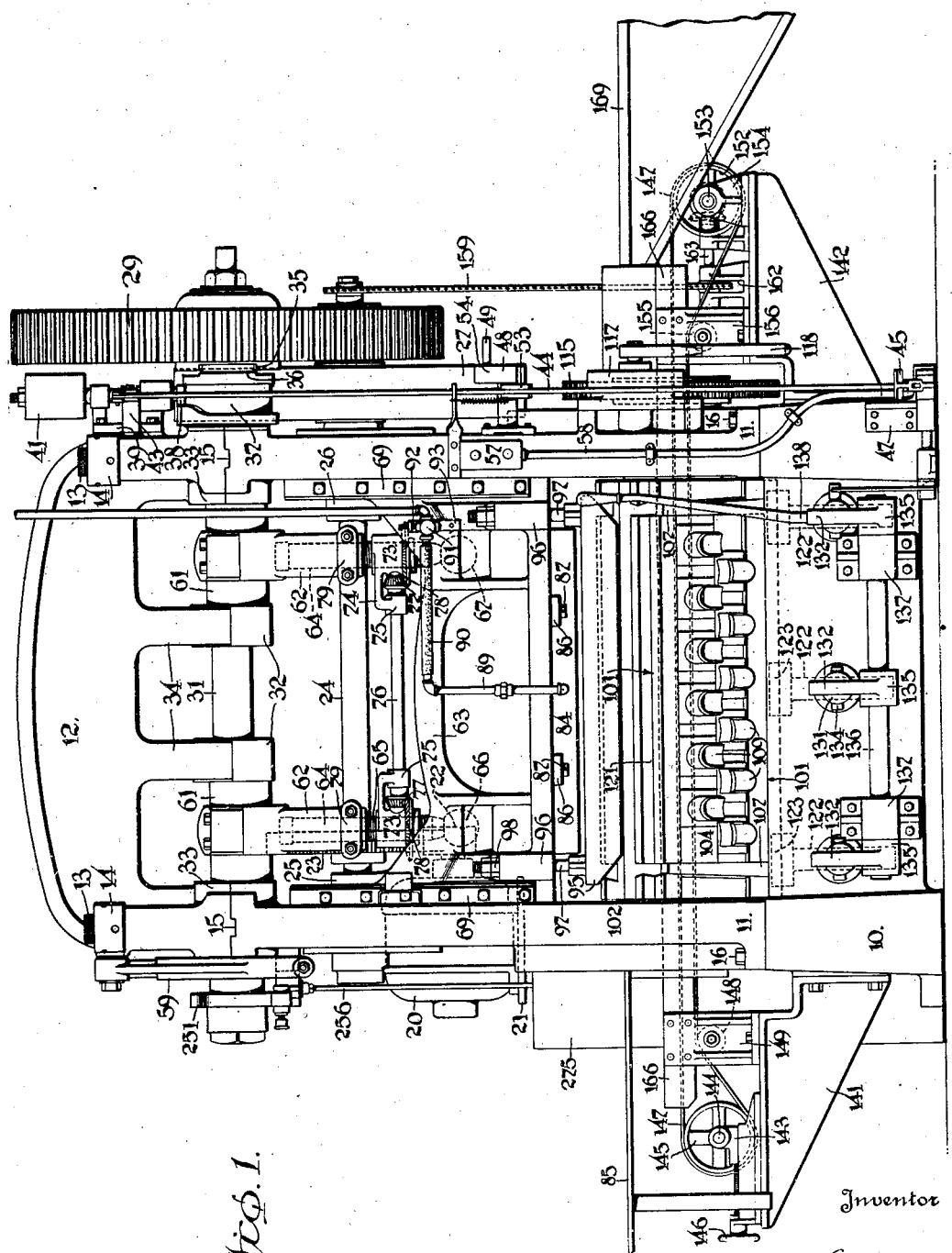
Fig. 1 is an elevational view of the discharge end of the machine.

*Machine frame and driving mechanism. Figs. 1, 2 and 3*

The main frame of the machine comprises a bed, or base 10, of metal cast in substantially rectangular shape, that has mounted thereon a pair of upright side members 11, supporting a bridge or upper frame section 12. The three members 10, 11 and 12, forming the main machine frame, are rigidly secured by means of threaded posts 13, that extend through suitable apertures formed in the members 11 and 12 into the bed plate 10. Heavy nuts 14 are employed to retain the posts 13 in position, and locking means, such as tongue and groove connections 15 between the bridge 12 and side frame 11, and machine bolts 16, between the side walls and the base 10, are also included to insure a rigid assembly that will withstand the effects of heavy vibration.

A motor 20 for driving the reciprocating cutting mechanism is mounted, for convenience, upon a shelf 21, that is suitably secured to one of the upright members 11 on the intake end of the machine. The motor shaft has keyed thereto a pinion gear 22 (Fig. 5) which intermeshes with a gear wheel 23, secured upon a driving shaft 24 that is mounted in two journal boxes 25 and 26, of suitable design, positioned upon the face of the frame 11. A flywheel 27, of relatively large mass, and a pinion gear 28 are keyed upon the shaft 24 at the end opposite to the motor 20 and gear wheel 23.

The pinion gear 28 intermeshes with a gear wheel 29, of relatively large diameter, which is loosely mounted upon the end of a crankshaft 31 that supports the reciprocatory platen. This shaft is journaled in a plurality of bearings 32 and 33, that are disposed respectively at the ends of depending arms 34 formed on the bridge 12, and between the upright members 11 and the upper portion of the frame. In order to provide a driving connection between the gear wheel 29 and the crankshaft 31, the hub of the gear wheel is provided with serrations 35, for the reception of fingers 36 formed on a cam disc 37, slidably secured to the crankshaft 31. The member 37 is held in inoperative position by means of a depending finger 38, mounted for vertical sliding movement in a bracket 39, and urged downwardly by a counterweight 41 secured thereto.

When the finger 38 is in its lower position, as illustrated in Figs. 1 and 2, the disc 37 is forced inwardly and away from the hub of the gear wheel 29, by means of a cam formed on the edge thereof that engages the finger. When the member 38 is raised, the disc 37 is urged into operative relation by means of suitable springs, not shown, and thus transmits power from the gear wheel 29 to the crankshaft 31.

The clutch is operated by means of a lever 42, pivoted to the frame 11 as indicated at 43, to one end of which is secured a rod 44, that extends downwardly at the side of the machine to a foot treadle 45, to which it is joined by a pin connection 46. The treadle is pivotally mounted on a bracket 47, secured to the base 10 of the frame. When the treadle is in its uppermost position, the finger 38 contacts with the cam disc 37, and prevents transmission of power from the gear wheel 29. When the treadle is depressed, the finger is raised, allowing the cam disc to move to the right toward the gear wheel 29, or into operative relation therewith.

A manually controlled treadle lock is provided to maintain the parts in operative relation, and it consists of a pivoted latch 48 secured to the frame 11, and having an operating handle 49 attached thereto. The latch 48 is provided with a notched finger 51, that engages a recess 52 formed in a boss 53 secured to the rod 44, to prevent the downward movement of the foot treadle 45. The finger 51 is disengaged from the boss by moving the operating handle 49 toward the discharge end of the machine, and while it is in this position, the foot treadle may be depressed to connect the crankshaft 31 to the source of power. The latch is also provided with a counterweight 54, that normally urges the finger 51 toward the discharge end of the machine. Release of the handle 49, while the foot treadle 45 is in its depressed position, causes the finger 51 to move toward the discharge end, and to engage a shoulder 55 formed on the upper portion of the boss 53, to serve as a lock preventing the upward movement of the rod 44. Subsequent movement of the handle 49 toward the discharge end causes the finger 51 to be disengaged, to permit upward movement of the rod under the influence of the counterweight 41, to disconnect the clutch.

For convenience, the controls for the electrical system to which the prime movers are connected may be disposed adjacent the clutch operating mechanism. A push button switch 57, attached to a conduit 58 secured to the face of the frame, has been found to be satisfactory. The opposite end of the crankshaft 31 is surrounded by a brake band 59 that is pivoted to the machine frame 12, and which is placed under sufficient tension to stop the machine quickly when the clutch is disengaged, or when the switch 57 is opened to disconnect the motor 20.

The crankshaft 31 is provided with a pair of crank arms 61, on which are journaled connecting rods 62 that support a movable platen frame 63. Each connecting rod is formed with an elongated screw threaded aperture 64, in which is placed a heavy screw 65, provided at its lower extremity with a ball head 66 that is positioned in a spherical socket 67, formed in the platen frame 63. Suitable bridging members, indicated at 68 in Fig. 4. may be provided to secure the balls within the frame. This construction, involving a type of universal joint, permits the connecting rods 62 to oscillate freely about the crank arm 61, and at the same time, allows the platen frame 63 to move in a vertical direction between two pairs of guides 69, secured by bolts 71 to the inner faces of each upright frame member 11.

Each screw 65 has mounted thereon, prior to its assembly with the platen frame 63, a sleeve 73 that is provided with an inwardly extending arm 74 having a bearing 75 at the end thereof, that supports an adjusting shaft 76. Bevel gears 77, keyed to either end of the shaft 76, intermesh with gears 78, that are secured on the screws 65. Inasmuch as the sleeves 73 cannot turn with respect to each other, rotation of the shaft 76 causes a longitudinal movement of the screws 65 within the threaded apertures 64 of the connecting rods 62, which results in an alteration of the lowermost limit of travel of the platen frame 63. The adjustment of the effective length of each rod 62 is effected simultaneously, and equal displacements may be obtained by properly proportioning each set of gears. A clamping bar 79 is secured to each post 62, and provides a means to maintain the desired length, after the platen frame 63 has once been adjusted.

*Cutting mechanism. Figs. 1 and 4*

The cutting or stamping operation is performed between a pair of platens, the upper one of which has a vertical reciprocatory motion imparted thereto by the mechanism described above. The fixed platen is positioned within the frame of the machine, and has secured thereto a plurality of dies that are forced through the sheet of material and against the lower surface of the movable platen member 63, as the latter reaches its lowermost limit.

The platen frame 63, which is substantially triangular in cross section, has secured to its lower face 81, by suitable means such as bolts, a trapezoidal block of steel 82, that extends across the entire cutting surface. Co-extensive therewith, and secured thereto by means of a dovetail slot 83 engaging the exposed surfaces of the block, is a movable platen 84, that preferably is made of an aluminum alloy, or other soft metal that will not damage the edges of the cutting dies that are forced against it. The platen 84 may be positioned upon the block 82 by sliding it longitudinally of the machine through an aperture formed in the frame 11, and over a shelf 85 illustrated in Fig. 3. Lugs 86 are formed integrally with the platen 84 and are pierced for reception of bolts 87, by means of which the platen is maintained in the desired position.

A plurality of communicating apertures 88, positioned over the dies on the lower platen, are formed in the member 84, and are connected to a conduit 89, that is secured to the outer surface of the platen frame 63, and which is, in turn, connected, through a suitable flexible hose 90, to a source of compressed air, employed for the purpose of removing the severed slugs from the sheet of resilient material. For efficient operation, the full force of air blast should be impressed upon the slugs at the moment of their severance from the sheet, and to attain this end, an automatically controlled cut-off valve 91 is placed in the air supply line.

The valve 91, which has a spring pressed seat, is disposed adjacent the reciprocating member 63, and is fixed with respect to the machine frame. As the frame 63 approaches its lowermost position, the valve stem contacts with a screw 92, that is adjustably mounted in the end of a bracket 93, secured to the movable platen frame. Sufficient compressed air to remove the severed slugs passes through the valve and into the apertures 88, during the interval that the valve remains open. During the remaining portion of the cycle, the air supply is cut off, and thus an unnecessary operating loss is avoided.

The sheet of resilient material is conveyed past the platen 84, and is maintained in correct position with respect thereto, by means of a table or stripper plate 95, that is suspended from the platen frame 63. Apertured bosses 96 are formed at each corner of the frame 63, for reception of bolts 97, secured to the corner of the table 95, that are positioned by means of nuts 98. The table may be drawn toward the platen 84 by turning the nuts, and preferably, just sufficient space is retained between the two surfaces to permit the free passage of the sheet. The table 95 is provided with a number of staggered apertures 99, of slightly greater area than, and having the same shape as, the contour of the cutting dies, that are in alignment therewith to allow the dies to penetrate the material.

The lower, or fixed, platen comprises a rotatable prismatoidal member having a plurality of sets of dies or cutting elements of varying dimensions disposed in each surface thereof. From practice, it has been determined that three sets of dies are sufficient to provide for the variations resulting in the thickness of the stock, although a greater number may be employed if desired.

The platen shown in the drawings comprises a substanitally triangular prism 101, having three die blocks 102, 103 and 104, mounted on the faces thereof. Each block is secured to its respective face by means of a dovetail connection 105, and it is maintained in position by means of a plurality of screws 106, angularly disposed in the faces of the platen, and by means of locking bars 107, that are transversely disposed at the ends of the blocks in suitable channels formed in the faces of the platen. Gibs 108 may be provided to compensate for variations in the width of different blocks, and to distribute uniformly the load imposed by the screws 106. The blocks may be removed, like the movable platen 84, through an aperture formed in the side of the machine.

A plurality of hollow dies 109 formed of hardened steel, and having apertures corresponding to the shape of heel slugs, are removably secured in staggered relation on each of the die blocks 102, 103 and 104, and in alignment with the apertures 99 in the table 95. The dies in each set are preferably of the same size, but the dies are of slightly different dimensions, in order to compensate for the variations in the thickness of the stock. In practice, the dies are dimensioned and are so assembled on the platen 101 that the intermediate or middle sized dies will cut slugs of the proper volume when the sheet has a standard thickness or gauge. The larger and smaller dies are employed to cut slugs of greater or lesser area from thinner or thicker stock, and are positioned upon observing a change in the gauge of the sheet. Preferably, the die sets are replaced as a unit when it is desired to form slugs of different volume, and the individual dies need be replaced only in case of breakage.

As best shown in Figs. 2 and 3, the support for the fixed platen consists of a pair of trunnions 111 of relatively large diameter, that are journaled in pillow blocks 112 and 113, secured in the apertures formed in the side frame members 11. A gear wheel 115, keyed to the trunnion 111 adjacent the bearing 113, is in engagement with a gear wheel 116 enclosed within a suitable housing 117 positioned upon the side frame member 11. The gear wheel 116 may be rotated through a conventional ratchet mechanism (not shown) associated therewith, that is controlled by a lever 118. Rotation of the gears causes a revolution of the fixed platen 101, so as to present a new set of dies to the stock, and this operation should be performed whenever it is observed that the thickness of the sheet has varied appreciably. When proper alignment of the platen is attained, as indicated by the registering of a pointer 119 with suitable marks scored in the rim of the gear wheel 115, the platen is locked in place.

Each apex of the platen 101 is cut away and is provided with a tapered slot or channel 121, as shown in Fig. 4, for the reception of a plurality of tumblers 122, that enter the lower channel to lock the platen in operative position. Each tumbler comprises a T-shaped member, having a tapered head 123 adapted to engage the slot 121, and a circular stem 124, that is disposed in a well 125 formed in the bed 10 of the frame. Each stem is flattened on one side and is provided with angularly disposed teeth 126 on the flattened portion thereof, that engage similar teeth 127 formed on a plunger 128 that is mounted for sliding movement in an aperture 129 intersecting the aperture 125.

The projecting end 131 of each plunger 128 is bifurcated for the reception of an upstanding lug 132, that is provided with an elongate slot 133, through which is disposed a pin 134 that secures the plunger and lug to each other. The lug terminates at its lower end in a collar 135, that is keyed to a shaft 136 journaled in bearings 137 that are mounted upon the base 10 of the main frame. An upwardly extending lever 138 is secured to one of the lugs 132, preferably the one on the extreme right, as illustrated in Fig. 1.

When the lever 138 is moved in a direction away from the machine, the plungers 128 are constrained to move therewith, with the result that the intermeshing teeth 126 and 127 slide upon each other to lower the tumblers 122. The securing pins 134 move within the elongate slots 133, to compensate for the eccentricity introduced by the rotative motion of the lugs 132 relative to the plungers 128. The platen 101 may be rotated, by operation of the ratchet gearing controlled by means of the lever 118, and, when the desired registry is obtained, the platen is locked by moving the lever 138 toward the machine.

*Slug removing system.* (*Figs. 1, 2, 3 and 4*)

The mechanism for removing the slugs severed from the sheet comprises a traveling belt that receives the slugs as they are forced through the dies by means of the air blast, and that conveys them to suitable receptacles placed adjacent the machine.

Supports upon which the conveyor belt is mounted, are secured to either side of the machine frame, as indicated at 141 and 142, respectively. The support 141 has secured thereto a pair of journal boxes 143 that rotatably support a shaft 144 having a conveyor roller 145 keyed thereto. Each journal box 143 is longitudinally adjustable, by means of a screw 146 disposed in the base thereof, in order to tighten a conveyor belt 147 that passes around the roller 145. An idle roller 148, positioned between bearing brackets 149 secured to the table 141, contacts with the under side of the belt, primarily to reduce the distance between the advancing and receding portions thereof.

The belt extends beneath the apertures in the dies through a hollow portion 151 formed about the axis of the platen 101 and its attached trunnions 111, and around a conveyor roller 152, keyed to a shaft 153, that is rotatably supported in two journal boxes 154, secured to the support 142. An idle roller 155, supported between brackets 156 positioned on the table 142, contacts with the under side of the belt, and fulfills the same function as those attributed to the idler roller 148.

The belt is driven by means of a suitable chain of mechanism connected to the main driving shaft 24. A sprocket wheel 158, keyed to the end of the shaft 24, has positioned thereon a link belt or chain 159 that extends around a similar sprocket wheel 161, mounted at right angles to the conveyor roller 152 in a bearing 162. The shaft 163 of the sprocket wheel 161 projects outwardly toward the axis of the conveyor roller 152, and has keyed thereto a bevel gear intermeshing with a bevel gear 164 that is keyed to the shaft 153. The gear ratios are so chosen that the belt 147 is driven at a comparatively high velocity, to insure the rapid removal of the slugs that fall thereon.

Belt guides and guards are provided to prevent the slugs from falling off at the sides of the belt. This means comprises members 166 that are secured to the brackets 149 and 162, and which are provided with overhanging ledges 167 extending through the aperture formed in the platen 101, that prevent the belt from moving upwardly and away from the conveyor rollers. The slugs are accordingly constrained to drop from the belt at the end thereof, and are received in a suitable hopper or chute 169 disposed adjacent thereto, as illustrated schematically in Fig. 1.

*Stock feeding system.* (*Figs. 2, 3, 5 and 6*)

The sheet of raw material is fed periodically across the table 95 and over the dies 109, in order to present a fresh area to the cutting elements as the movable platen 84 reaches its lowermost position. Preferably, the sheet is conducted to the intake end of the machine by means of a belt conveyor, the movement of which is controlled by means of suitable gearing that is actuated automatically and periodically by means of a kinematic system associated with the crankshaft 31.

Positioned at either side of the machine on the intake side thereof are bearing brackets 181 and 182 in which is rotatably mounted a conveyor roller shaft 183, that is driven by means described in detail hereinafter. The shaft 183 has a conveyor roller 184 keyed thereto around which is disposed a conveyor belt 185, for conducting the stock to the machine. The opposite bend of the belt passes around a similar conveyor roller 186 that is keyed to a shaft 187, rotatably supported in a pair of bearings 188 and 189. These bearings are longitudinally adjustable, for the purpose of tightening the belt 185, and are secured to a frame including a shelf 191, that extends from upright members 192 positioned between the conveyor rollers 186 and 184.

The mid portion of the belt is supported by a plurality of idle rollers (not shown) that are journaled between a pair of frame members 193 and 194 extending from the upright members 192 to a similar post 195. The various elements forming the supporting frame may be fabricated from any suitable material, such as structural steel, and they may be reinforced or braced in accordance with good engineering practice. In operation, the sheet of calendered stock is fed onto the conveyor belt by any suitable means, being guided thereon by a sloping guide 196. Various auxiliary elements are provided on the conveyor, in order to insure a periodic feed of the material in unison with the motion of the belt 185, which is driven by the mechanism described below.

The stock is retained in place on the belt adjacent the intake side of the machine by means of an idle roller 197, that is pivotally mounted on the frame 194 by a pair of links 198. Studs 199 are provided on the outer surface of the belt, in order to grip the resilient material, and to prevent slippage. The two rollers 184 and 186 are both driven from the same source of power, in order to reduce slippage of the belt with the sheet attached thereto.

This drive consists of a bevel gear 201, keyed to the shaft 183, that intermeshes with a bevel gear 202, keyed to a shaft 204, extending longitudinally of the belt, and journaled in a bearing 205 secured to the conveyor frame, and a bearing 206 positioned around the shaft 187. The end of the shaft 204 is provided with a keyway 207 for the reception of a key formed on the hub of a bevel gear 208 that intermeshes with a similar bevel gear 209 secured to the shaft 187. When the shaft 187 is moved longitudinally, by adjustment of the journal boxes 188 and 189, the bevel gear 208 is likewise constrained to move along the keyway 207 to the new position. A brake 211 is positioned around the end of the conveyor roller 184, and it is subjected constantly to a sufficient degree of tension to overcome the inertia of the moving parts and to prevent the belt from moving forward after the power is disconnected from the shaft 183, in order to prevent excess material from being fed to the dies.

Guard plates 212 and 213, disposed above and below the material, and pivoted between the roller 184 and the platen 84 and stripper plate 95 respectively, may also be provided to prevent the sheet from bulging as it passes from the belt 185 into the machine. These various elements associated with the conveyor cooperate to attain the ultimate objective of feeding a definite and constant length of material to the dies for each cycle of the movable platen 84.

The driving system for the conveyor belt comprises a motor 221 having a pinion gear 222 keyed to the shaft thereof that intermeshes with a gear wheel 223 secured to a driving shaft 224. This shaft is rotatably mounted in pillow blocks 225 and 226 that are positioned on a base member 227 disposed near the base 10 of the main frame. A gear wheel 228, keyed to the shaft 224, engages a gear wheel 229 that is loosely mounted upon a countershaft 231 positioned in suitable bearings 232.

The shaft 224 has a clutch disc 234 secured thereto, that is adapted to cooperate with a clutch sleeve 235 to transmit power to a pinion gear 236, loosely mounted upon the shaft 224. The clutch is operated by means of an arm 237 surrounding the clutch disc 234, and pivoted to the base 227, as indicated at 238, which is connected to a rod 239 that extends from the gear system to a place readily accessible to a machine attendant. The loosely mounted pinion gear 236 intermeshes with a gear wheel 241 that is keyed to a shaft 242, to which is also rigidly secured a sprocket wheel 243.

When the pinion gear 236 is rotated with the shaft 224, by moving the clutch disc to the left, as viewed in Fig. 5, power is transmitted through the gear wheel 241 to the roller conveyor shaft 183, by means of a link belt or chain 244 that extends between the sprocket wheel 243 and a sprocket wheel 245, keyed to the roller conveyor shaft. The dimensions of the elements of the power transmission system extending from the motor 221, through the gear wheels 236 and 241, to the shaft 183, are so chosen that the belt 185 travels at a relatively high speed, when it is so driven. This system is employed when a fresh sheet of stock is applied to the distant portion of the belt, and it is desired to conduct it to the dies in a minimum period of time.

However, after the sheet has been introduced to the dies, it should be advanced in definite increments and in synchronism with the movement of the crank shaft 31. During this phase of operation, the loosely mounted gear wheel 236 is disconnected from the shaft 224, and the roller conveyor shaft 183 is actuated by means of a system of kinematic elements, whose time of operation depends upon the position of the movable platen 84.

As illustrated in Fig. 3, the crankshaft 31 has secured to the outer end thereof a cam 251 that contacts with a roller 252 journaled in the end of a lever 253 that is pivotally mounted in the side frame 11, as indicated at 254. The cam is so dimensioned and adjusted upon the shaft 31 that it will depress the engaging end of the lever 253, during that portion of the cycle of the machine occurring on the upward stroke of the platen frame 63. The end of the lever 253 opposite to the roller 252 is joined by means of a clevised connection 255 to a rod 256 extending downwardly toward the gear system just described.

The rod 256 is connected to a plurality of links that collectively form a compound link, as illustrated in Fig. 6 and indicated generally by the reference numeral 257. These links are so organized that upon the upward movement of the rod 256, resulting from the depression of the roller 252, a finger 261 moves toward the machine frame 10 to actuate a clutch 262, that connects the loosely mounted gear wheel 229 to the countershaft 231, and which is so constructed that it permits the countershaft to make but one revolution for each time it is engaged.

The clutch 262 is somewhat similar in principle to the one described in connection with the mechanism for operating the reciprocating platen 84. As the finger 261 moves inwardly toward the frame 10, it releases a spring mechanism contained within the clutch 262, that causes a member 263 to be withdrawn from a cam disc secured to the shaft 231, and thereby permits the shaft to be coupled to a clutch disc secured to the gear wheel 229, for one complete turn. The shaft 231 is then positively driven from the motor 221, through the train of gears 222, 223, 228 and 229.

A brake wheel 265 is keyed to the end of the shaft 231, and has a pair of blocks 266 secured to the outer face thereof. These blocks are spaced and are so disposed upon the wheel as to form a guide for a crank pin 267 that is free to move between them. A connecting rod 268 is positioned upon the pin 267 and it extends upwardly to a pivoted connection 269 formed on ratchet housing 271 that is loosely mounted upon the conveyor roller shaft 183. Rotation of the shaft 231 accordingly causes a rotation of the eccentrically disposed guide blocks 266, with a resulting displacement of the housing 271 about the shaft 183.

A plurality of pawls 272 are disposed within the housing 271 adjacent the inner periphery thereof, and they are adapted to engage teeth formed in a ratchet wheel 273 that is keyed to the shaft 183. As the housing 271 is moved in a clockwise direction during the throw of the connecting rod 268, the ratchet wheel 273 is constrained to move therewith, and hence to rotate the rollers 184 and 186 and to advance the belt 185, with the stock disposed thereon, a pre-determined distance. The displacement of the connecting rod 268, and its time of operation is so regulated as to introduce new stock to the dies during the upward stroke of the platen 84.

The length of sheet advanced depends upon the distance that the belt moves forward, and this in turn depends upon the gear ratios existing between the elements of the power tranmission system. The dimensions of the gears and cooperating elements may readily be so proportioned that the distance advanced is a fixed and determined quantity. By employing constant speed motors 20 and 221, that are operated from the same source of power, a definite velocity relation is obtained between the speed of the crankshaft 31 and of the conveyor roller shaft 183. Both the amount of sheet advanced, and its time of introduction to the dies, are made to depend upon the speed and position of the movable platen 84, or, in other words, the two motions are synchronized.

To prevent the introduction of an excess of material to the dies, the cam 251 is so dimensioned and positioned as to permit the upward movement of the lever 252 to disconnect the clutch 262 in time to prevent more than one complete revolution of the shaft 231. Inasmuch as the momentum of the parts will cause the stock to be advanced an appreciable distance after the power is disconnected, it has been found advisable to provide a dampening device, such as a brake band 274, that is positioned around the wheel 265, and thereby to insure the stoppage of the shaft 231 before an excess of material is advanced to the dies. To protect the conveyor control mechanism from injury, and also to reduce possibility of accidents, the parts may be enclosed in a suitable housing as indicated at 275.

*Operation*

The various devices for determining the lower limit of travel of the movable platen, for tensioning the belts, and for determining the width of stock advanced at each cycle are, of course, adjusted to obtain the desired conditions prior to the introduction of sheet material to the dies. Three sets of dies are positioned in the platen 101, with the size uppermost that corresponds to the initial thickness of the sheet from which the slugs are to be cut. The platen is locked in position by the tumblers 122 controlled by means of the lever 138.

The foot treadle 45 is brought to its upper position, in order to disconnect the gear wheel 29 from the crankshaft 31, and the motors 20 and 221 are started by manipulation of the switch 57. The sheet of stock, the end of which has been placed through the guide 196 and on the belt 185, is then conveyed rapidly to the plate 95, by pulling the handle 239 to connect the motor 221 to the roller conveyor shaft 183. As the sheet is conveyed to the dies, it is dusted or coated with soapstone for a purpose to be explained presently. When the edge of the sheet has been introduced between the guard plates 212 and 213, positioned between the roller 184 and the movable platen 84, the clutch 234 is disconnected, to prevent a further rapid advance of the conveyor belt 185.

The crank shaft is then connected to the driven gear wheel by depressing the foot treadle 45 and locking it in position by means of the latch 48. The platen 84 then moves with a vertical reciprocatory motion above the dies 109, to cut a plurality of slugs from the sheet during each cycle. During each upward stroke of the platen 84, the gears connecting the motor 221 to the connecting rod 268 are actuated sufficiently to permit one revolution of the crank pin 267, to thereby advance the belt 185 with the sheet a pre-determined distance, equal approximately to the length of a single die. As the platen 84 moves downwardly, the clutch 262 is released, and excessive advance of the sheet is retarded by means of the brakes 211 and 274, which counteract the effect of the momentum of the belt 185 and gear 229.

A fresh surface of coated material is thus presented to the dies 109, as they contact with the sheet through the registering apertures 99 formed in the table 95. As the dies approach the platen surface 84, the screw 92 contacts with the stem of the valve 91, to admit compressed air through the apertures 88. The pressure becomes a maximum at the moment of complete severance, and the air forces the slugs through the apertures formed in the dies 109, and on to the traveling belt 147 positioned therebeneath.

It has been observed that slugs of unvulcanized rubber cut from a sheet that has not been treated with soapstone, talc, or like material, exhibit a tendency to stick to the dies, and to collect within the die apertures, even when a relatively high air pressure is used. Slugs cut from dusted sheets do not exhibit this tendency however, but are forced through the dies readily. The blast of air, which impels the slugs violently through the apertures in the dies and against the moving belt 147, serves the additional function of removing excess soapstone from the slugs, and it creates a medium of highly agitated air containing innumerable dust particles through which these slugs must pass. Each surface of every slug is coated with a film of soapstone particles, which adheres thereto as the plastic gummy surfaces of the slug, bouncing from and turning on the moving belt, are exposed to the agitated dust laden atmosphere. This treatment improves the the quality of the slugs, by removing excess material that would blemish the finished heels, and it also prevents sticking and thereby greatly facilitates the labor of handling the material between the time of cutting and of vulcanization.

As the platen 84 moves upwardly, the compressed air is cut off at the valve 91, and the sheet of material is advanced by means of the gear system operated through the cam 251. During the upward movement, the separation of the stock from the dies 109 is facilitated by means of the stripper plate 95, that carries the sheet upwardly with the platen 84. The waste material from the sheet is discharged at the rear of the machine and is removed by any suitable means.

The slugs that are discharged from the belt 147 into the hopper 169 may be placed in suitable packages and conveyed to the vulcanizing molds. If it be observed that the slugs are not of the proper volume, the machine is stopped, by disconnecting the gear wheel 29, and the movable platen 84 is quickly brought to rest by the action of the brake 59. The platen 101 is then unlocked and rotated, to bring the dies of proper size uppermost. The operation of cutting may then be resumed, as just described. Sufficiently accurate control of the volume of the heels is readily accomplished, for example, by weighing a sample heel selected periodically during operation.

When the last portion of the sheet from which the slugs are being cut is removed from the belt 185, another sheet may be advanced rapidly by operating the handle 239, to reduce lost time of operation. The fact that the ratchet mechanism 272 is being actuated to drive the roller conveyor shaft 183 while the clutch 234 is engaged, is immaterial, inasmuch as the drive through the clutch 234 advances the belt 183 more rapidly, and the only effect of the dual engagement is to cause the ratchet wheel 273 to race ahead of the pawls 272.

All parts of the machine are constructed of materials having high strength, inasmuch as the repeated blows of the soft metal platen 84 against the hard edges of the dies 109 create considerable vibration. The provision of the fly wheel 27 and the gear wheel 29 of relatively large diameter assist materially in obtaining a uniform operation.

From the foregoing description, it will be apparent that a machine has been provided to produce rapidly a large quantity of heel slugs of uniform volume. The provision of a plurality of dies reduces the number of machines previously required in substantially an inverse ratio to the number of dies employed in each set. This naturally results in a considerable saving of the cost and upkeep of the older type of machines. Since the dies are held by rigid means, minimum clearances are attainable, and hence the percentage of waste is greatly reduced. The stamping operation may be continued also, while the stock is being advanced, inasmuch as it is controlled by means actuated by the reciprocating platen. The slugs or blanks produced do not adhere to each other and they are coated uniformly with protective material, and hence they may be vulcanized more readily to yield a satisfactory product.

These advantages, and others incident to the operation of the machine, result in a considerable increase in the efficiency in the manufacture of rubber heels. The machine may be utilized for the production of blanks of other shapes, such as soles, by supplying dies of proper configuration, and likewise, the slugs may be cut from other materials, such as leather. Other adaptations may be attained, by minor modifications in the machine structure, and hence it is to be understood that the invention is not limited to the specific details and uses, described herein for the purpose of illustration. Only such limitations should be imposed upon the invention, therefore, as are indicated by the scope of the following claims.

What I claim is:

1. A slug cutting machine comprising a machine frame having a movable platen mounted therein, means formed with the platen for the admission of fluid under pressure to force severed material from the platen, a fluid check valve disposed on the frame for the platen, and means on the machine frame to open the valve when the platen approaches its lowermost position.

2. The combination with a slug cutting machine having a die supporting platen rotatably supported therein, of a platen lock comprising a plurality of vertically movable locking members disposed in the base of the machine, horizontally movable plungers disposed in the base of the machine and controlled simultaneously by means of operating mechanism associated therewith, and gearing means interposed between the locking means and the plungers to cause vertical movement of the locking means as the plungers are actuated.

3. The combination with a slug cutting machine of a die supporting platen adapted to be rotatably mounted therein, comprising a polygonal member having recesses formed in the faces thereof for the reception of a group of dies secured to a separate member, and formed with an aperture at the center thereof providing a means for the removal of slugs severed by the dies and conveyor means movable through the aperture adapted to receive and support the slugs for removing the same.

4. The combination with a slug cutting machine of a fixed platen adapted to be rotatably mounted therein, comprising a polygonal member formed with channels in the faces thereof for the reception of die supporting plates, and fastening means for the die supporting plates including transversely disposed screws adapted to engage the sides of the plates, and retaining bars adapted to engage the ends of the plates.

5. A slug cutting machine comprising a machine frame having a plurality of dies disposed therein, a platen mounted for vertical movement above the dies, and means movable with the platen to support a sheet of stock.

6. A slug cutting machine comprising a machine frame having a die supporting platen positioned therein, a plurality of perforated dies disposed on the platen, a movable platen mounted above the fixed platen for reciprocatory movement, a table for supporting a sheet of stock against the platen formed with apertures permitting the passage of the dies through the stock, and means to force slugs severed from the sheet through the perforations formed in the dies.

7. A slug cutting machine comprising a frame having a plurality of perforated dies positioned therein, means for impressing the dies through the sheet, means for pneumatically forcing the slugs through the dies, and continuously moving means for receiving the severed slugs and for removing them from the machine.

8. The combination with a slug cutting machine of a conveyor for advancing stock, a gear system for driving the conveyor, means for actuating the driving means independently of the motion of the machine to advance the sheet rapidly, and means for actuating the driving means in synchronism with the motion of the machine.

9. A slug cutting machine comprising a machine frame having a reciprocating platen mounted therein, a belt conveyor for advancing sheet material to the reciprocating member, a cam associated with the reciprocating member, a clutch controlled by the cam, and a ratchet mechanism associated with the belt conveyor for rotating the same a predetermined amount actuated by the clutch.

10. A slug cutting machine comprising a machine frame having a plurality of sets of dies of different dimensions disposed therein, a reciprocating platen mounted above the dies, a stripper plate disposed beneath the reciprocatory platen, means to convey sheet material of variable thickness to the stripper plate in increments of uniform width, and means to interchange the die sets in accordance with the variations in the thickness of the sheet to cut slugs of substantially uniform volume.

11. A slug cutting machine comprising a machine frame having a perforated reciprocating stock supporting table mounted therein, a plurality of interchangeable dies adapted to register with the perforations in the table, means to interchange the dies at will, means to separate the slugs from the sheet, and means to advance the sheet across the table periodically and in predetermined quantities between successive cuts by the dies.

12. A slug cutting machine comprising a machine frame having a hollow prismatoidal platen rotatably mounted therein, apertured dies disposed on the faces of the prismatoidal platen, a reciprocating table formed with apertures aligned with the dies positioned above the platen, means actuated by the movement of the table to advance a predetermined amount of stock across the table, means to force the dies through the sheet, means to force the severed slugs through the apertures in the dies, and means disposed beneath the dies to remove the severed slugs.

13. A slug cutting machine comprising a machine frame having a plurality of apertured dies disposed therein, a reciprocating member mounted in the frame and adapted to force the dies through a sheet of material, means to convey sheet material between the dies and the reciprocating member periodically and in predetermined quantities, means actuated by the movement of the reciprocating member to operate the sheet conveying means, means to force severed slugs through the dies, and continuously moving means positioned below the dies adapted to receive the slugs and to convey them from the machine.

14. A machine for cutting slugs from sheet material of variable thickness comprising a plurality of interchangeable apertured dies mounted in the frame of the machine, means for interchanging the dies at will, means for holding the dies in position, a reciprocating member mounted above the dies, a conveyor for advancing the sheet to the dies, a gear system for driving the conveyor intermittently operating at intervals determined by the position of the reciprocatory member, means for forcing the dies through the sheet, means for forcing slugs severed from the sheet through the dies, and a belt conveyor disposed beneath the dies for receiving the slugs and removing them from the machine.

In witness whereof, I have hereunto signed my name.

LAURENCE WETMORE.